Figure 1:
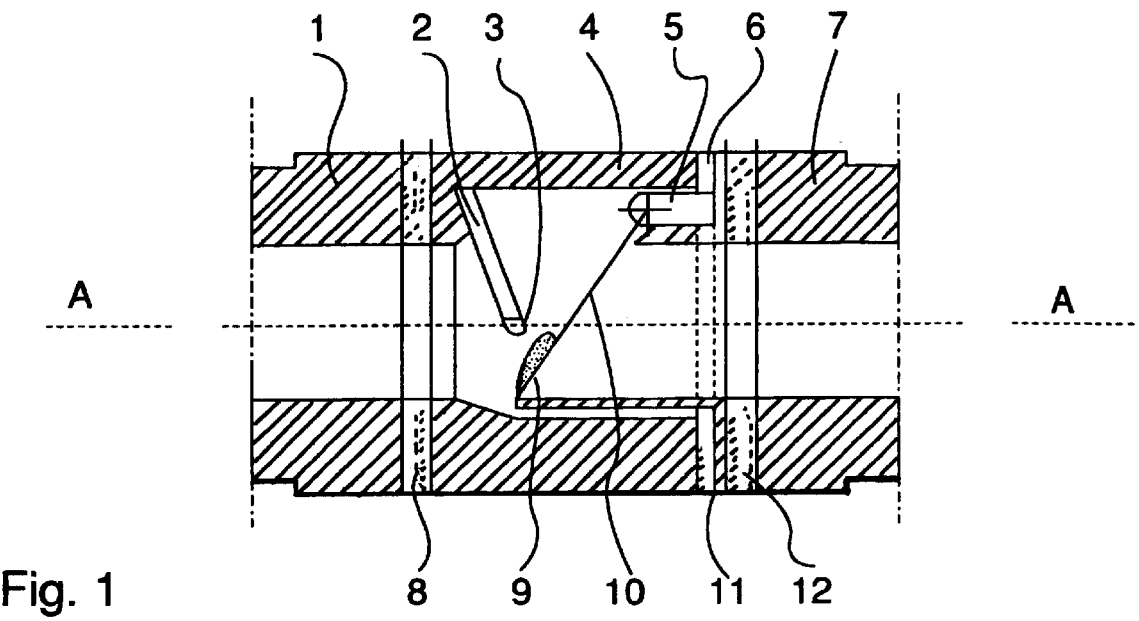

United States Patent
Paszkowska

[11] Patent Number: 5,921,208
[45] Date of Patent: Jul. 13, 1999

[54] THERMODYNAMICAL ASPIRATION VALVE

[76] Inventor: Monika Paszkowska, Lobeckerstrasse 18, D-10969 Berlin, Germany

[21] Appl. No.: 08/945,523
[22] PCT Filed: Apr. 23, 1996
[86] PCT No.: PCT/IB96/00362
   § 371 Date: Oct. 28, 1997
   § 102(e) Date: Oct. 28, 1997
[87] PCT Pub. No.: WO96/34184
   PCT Pub. Date: Oct. 31, 1996

[30] Foreign Application Priority Data

Apr. 28, 1995 [IT] Italy ................................. UR95A0039

[51] Int. Cl.⁶ ........................................................ F02B 33/04
[52] U.S. Cl. ...................... 123/73 V; 123/73 A; 123/438
[58] Field of Search ......................... 123/65 V, 51 B, 123/65 VB, 73 V, 73 A, 73 AA, 73 AB, 73 AV, 438

[56] References Cited

U.S. PATENT DOCUMENTS

| | | | |
|---|---|---|---|
| 4,254,745 | 3/1981 | Noguchi et al. | 123/51 B |
| 4,356,798 | 11/1982 | Sakaoka et al. | 123/52 MF |
| 4,432,324 | 2/1984 | Ishikawa et al. | 123/438 |
| 4,776,305 | 10/1988 | Oike | 123/65 PE |
| 4,920,932 | 5/1990 | Schlunke et al. | 123/65 PE |
| 5,033,419 | 7/1991 | Plohberger et al. | 123/73 V |
| 5,063,888 | 11/1991 | Ozawa et al. | 123/65 PE |
| 5,390,633 | 2/1995 | Taue | 123/65 V |

FOREIGN PATENT DOCUMENTS

| | | |
|---|---|---|
| 25 51 368 | 5/1977 | Germany . |
| 37 41 880 | 7/1988 | Germany . |
| 309649 | 4/1929 | United Kingdom . |
| WO 93/01398 | 1/1993 | WIPO . |

*Primary Examiner*—Noah P. Kamen
*Assistant Examiner*—Jason Benton
*Attorney, Agent, or Firm*—Evenson, McKeown, Edwards & Lenahan, P.L.L.C.

[57] ABSTRACT

An aspirating thermodynamic valve capable of controlling the flow of fuel mixture and air from the carburetor to the crankcase of a two-stroke engine includes a hollow body placed between the joint of the crankcase and the joint of the carburetor, along with suitably interpositioned seals. The valve includes a bush, the extremity of which is placed inside of the body and is cut out according to a predetermined inclination; furthermore, it includes a wall which is hinged by one end and is capable of closing the extremity.

6 Claims, 1 Drawing Sheet

THERMODYNAMICAL ASPIRATION VALVE

TECHNICAL FIELD

This invention relates to a thermodynamic aspirating valve.

More specifically, this invention relates to a thermodynamic aspirating valve for controlling and regulating the flow of fuel to the carburettor and to the crankcase of a two-stroke engine.

This invention can be applied specifically in the mechanical and automotive industry.

BACKGROUND ART

In the two-stroke engines known at present, the piston opens and shuts the aspiration inlet; therefore, the control of the mixture flow is symmetric relative to the two return positions.

The angle between the beginning of the opening of the aspiration inlet and the return position of the piston is equal to the angle between the return position and the end of the closure of the aspiration inlet.

In typical two-stroke engines the full angle of the opening of the aspiration inlet is contained within 100° and 110° of the cam shaft rotation; the half of the angle corresponds to the rotation of the piston in the external direction and the other half corresponds to the return of the piston.

It has been observed that the symmetrical control of the flow of fuel to the crankcase is not a good solution as the aspiration inlet should open much earlier and close later and this is not possible with the traditional piston position.

To avoid this inconvenience a solution has been adopted, according to which circulation of gas is made independent from the piston movements with a rotary throttling valve mounted on the cam shaft.

This valve allows a symmetrical inflow of fuel to the crankcase while it is opened and shut by a rotary plate.

This plate is cut accordingly to the angle corresponding to the angle of the opening of the aspiration inlet and the inflow of fuel to the crankcase is dependent on the size of the aspiration inlet.

Other known solutions allow automatic control of the inflow of fuel by the alteration of pressure in the crankcase.

For this purpose plate valves are applied that consist of springing plates interconnected in parallel.

Due to the pressure within the crankcase, these plates move away proportionally to the depression value which allows the fuel inflow.

When the balance of pressures is achieved the plates shut the aspiration inlet without allowing the fuel to return.

A system of this kind is based on a mode of mechanical control of the inflow of fuel to the crankcase and, in the case where rotary plates are used, the construction of the engine is complicated, which increases costs of production.

Another disadvantage of these systems arises from the fact that their accurate functioning takes place only if the r.p.m. value of the cam shaft rotation is strictly specified, which renders them virtually inapplicable; therefore, such systems practically are not employed in circuit racing engines and rally engines.

In the case where the plate valves are used, proper functioning and capacity of those depend on the materials from which they are manufactured.

Nevertheless, considering the fact that the plates are mounted rigidly, they do not sustain prolonged strain and are deformed and worn out, which causes breakdown that, in turn requires frequent replacements.

Additionally, operation of the plates prohibits, due to internal reactions, the slow inflow of fuel to the degree in which the increasing resistance of the plates does not allow the fuel to inflow when it is most demanded.

The above solutions have other disadvantages, such as unsolved problem of uneconomical fuel consumption and high degree of environmental pollution which are caused by the two-stroke engines.

However, the pollution produced by two-stroke engines is generally caused by faulty fuel supply during the work cycle.

Actually, the combustion chamber is flooded with fuel that cannot be fully consumed, i.e. burnt up, during the only two strokes of the cycle.

Due to the above, the application of two-stroke engines has been significantly reduced lately in spite of their cost-effective construction and economical operation.

U.S. Pat. No. 4,356,798 discloses an aspirating thermodynamic valve capable of controlling the flow of fuel mixture and air from the carburettor to the crankcase of a two-stroke engine. Said valve comprises a hollow body suitable for being placed between the joint of the crankcase and the joint of the carburettor, along with suitably interpositioned seals, a bush, the extremity of which is placed inside of said body and cut out according to a predetermined inclination, and comprising a wall which is hinged by one end and is capable of closing said extremity.

U.S. Pat. No. 5,390,633 discloses the arrangement of an aspirating thermodynamic valve between the crankcase of an engine and the carburettor, and exhibiting a bush, the extremity of which is placed inside of the crankshaft intake body and is cut out according to a predetermined inclination, and comprising a wall which is hinged by one end and is capable of closing said extremity.

DE-A-3,741,880 suggests a valve in which a wall is made of ferromagnetic material and an electromagnet is mounted on the valve body. In this case the attraction force is designed for opening the valve and not for returning the wall in the position of closure as described in the present invention.

DESCRIPTION OF THE INVENTION

The present invention aims to obviate to the disadvantages and inconveniences mentioned above, and to provide for a thermodynamic aspirating valve which allows, in the case where it is used in two-stroke engines, a specific amount of fuel required to combust, causing the increase of power assessed at about 50%, and reduction of combustion assessed at about 50%.

This is accomplished with a valve having the features described in the main claim.

The dependent claims outline advantageous forms of embodiment of the invention.

The proposed solution of this invention is based on thermodynamics laws (H. Faltin, "Technische Thermodynamik", Berlin 1961, W. R. Grundlach, "Einführung in die Technische Thermodynamik", Zürich 1947, A. Hall, E. Ibele, "Engineering Thermodynamics", Prentice Hall 1960), and is simply constructed and may be commonly used.

According to the invention, the thermodynamic aspirating valve contains a suitably articulated wall which closes a bush cut at an angle and operates according to the principle of a inclined Bendemann's nozzle that provides the variable ratio of the aperture (opposed to the constant ratio of the aperture possible to obtain e.g. in Laval's nozzle) dependent on the pressure in the crankcase.

Thus, the mechanical controlling of the fuel inflow to the crankcase is avoided.

The fuel flowing through such a nozzle, with a variable ratio of the aperture, constitutes a diasonic flow at the subsonic velocity.

Consequently, at the inlet of the inflow to the crankcase a phenomenon of dynamic Rankin-Hugoniot occurs and decompression of the gas coefficient is adjusted to any depression.

The flow of fuel mixture as diasonic flow depends on the rotation speed of the cam shaft. This fact does not allow the flow to separate from the aspiration pipe walls.

The above phenomenon prohibits whirl creation and the flow of gas coming out from the valve expands, prohibiting the return of the fuel during the full rotation cycle of the cam shaft.

According to the invention, the flow of fuel supplied to the crankcase through the valve wall is vibratory (which corresponds to the kinetic gas theory).

The above takes place within limits of the cam shaft rotation. The wall that shuts the inclined nozzle of the variable ratio of the aperture divides the fuel inflowing to the crankcase into portions and so at every stroke of the aspirating piston occur some of the supply cycles (from a pair to ten or more depending on the engine cubic capacity), at each subsequent cycle an energetic level higher to the precedent cycle occurs (the catapult phenomenon).

These cycles which divide the aspirating movement of the piston into more periods can be explained by means of laws of physics, in the moment in which the depression in the crankcase reaches values higher to the inertia mass of oscillating wall, the latter is opened and the fuel mixture is injected into the crankcase.

According to the invention, the oscillating movement of the wall is limited by a suitable buffer placed in the valve bush, this buffer being provided with elastic means suitable for attenuation of strokes coming from the wall.

Afterwards, at the opening of wall the latter is pushed against the buffer, rebounces from it coming into the shut position and temporarily breaking the flow of the fuel mixture.

During the return stroke, however, the wall encounters the flow of fuel which flows through the nozzle according to the Coulomb law and exerts pressure on the flow itself.

In practice, it may happen that the wall shuts progressively and, therefore, according to the Bernoulli law, the flow of the fuel mixture becomes faster reducing, at the same time, the pressure; this phenomenon, which occurs during the full period of the cam shaft rotation in the return compression mode, continues until the full closure of the wall.

At this moment the depression within the crankcase overcomes the force which holds the wall in place and the wall opens again initialising a new cycle.

According to an essential feature of the invention, the return movement of the wall is allowed by the operation of a permanent magnet, the power of which draws the wall into the shut position.

The aspirating valve, according to the invention, applying the thermodynamics laws, directly influences the efficiency of the two-stroke engine.

Tests conducted by the applicant have proven a fuel save up to 50%, as far as fuel consumption is concerned and comparable increase of power.

It has been also determined that the lifetime of the engine increases, contrary to what may be expected due to scarce lubrication caused by the reduced inflow of the fuel mixture.

The above fact occurs because the removal of the combustion residues is improved, as well as the intensity of the internal cooling thanks to elastic suffocation of the mixture, which behaves similarly to the liquids in Linde's coolers.

Therefore, the twostroke engine provided with the valve, according to the invention, does not overheat even at high ambient temperatures and in cases of full load, and even the self-ignition does not occur; besides, serious defects of the bridge at electrodes of sparking plugs do not occur that are typical for two-stroke engines.

Finally, a significant increase flexibility of the engine may be observed.

ILLUSTRATION OF FIGURES

Figure 2:
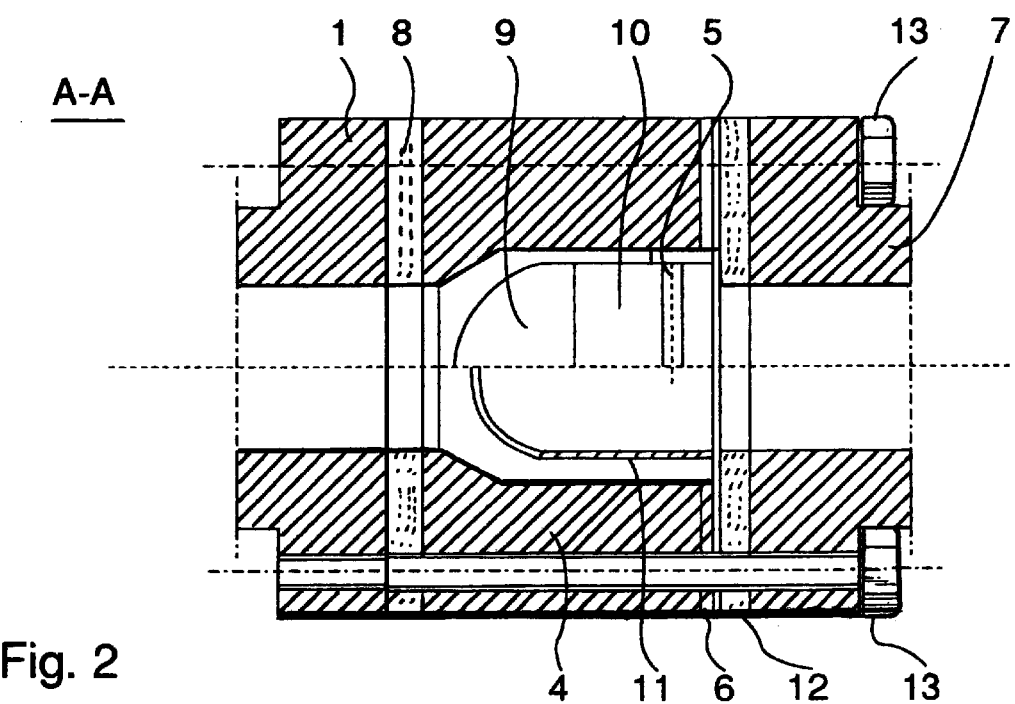

Other features and advantages of the invention will become apparent while reading the following description, which has been given as a non-limiting example, with the help of the figures illustrated in the attached drawings, in which:

FIG. 1 shows a schematic side section of the aspirating valve, according to the invention FIG. 2 shows a plan section, made along the A—A line, of the valve according to the FIG. 1.

DESCRIPTION OF A FORM OF EMBODIMENT

In the figures, a thermodynamic aspirating valve for a two-stroke engine, according to the invention, includes a body 4, inside of which is seated an inclined bush that has a nozzle or neck 11, the mentioned body being inserted between the junction 1 of the cylinder or crankcase and the junction 7 of the carburettor with the interposition of the respective seals 8 and 12.

A wall 10 inclined according to a predetermined angle is mounted above the neck 11; this wall 10 is movable around an axis defined by a couple of pivots 5.

Moreover, corresponding to the wall extremity 10, being at a distance from the bolts 5 there is a weight 9 which is selected depending on the technical characters of the engine.

As shown in FIG. 1, wall 10 is mounted and inclined according to a predetermined angle, for instance positioned at approximately 45 degrees, forming a Bendemann's nozzle having a variable ratio of aperture.

Seal 6 is mounted between body 4 and neck 11 along the edge of body 4.

According to the invention, a telescoping bumper element 2 is mounted inside of body 4; such bumper element consists of a sleeve threaded on its total length in order to regulate its position and has at its extremity resilient means 3, for instance a spring which fulfills double function of amortisation of the stroke of the wall 10 when the latter is fully opened, and the second function is exerting on the same wall a pressure which strains to draw wall 10 towards its closed position.

Finally, the valve is fixed to the engine body and to the carburettor by means of screws 13 (see FIG. 2).

An aspirating valve of this type allows gaining all advantages described above, to the extent at which the latter is easily adjustable to any type of a two-stroke engine, thanks to maximal aperture by means of bumper element 2.

As a result, an ideal filling of the crankcase with fuel can be achieved.

According to an essential feature of the invention, wall 10 is made of a ferromagnetic material, and a permanent magnet (not illustrated in the figures) is inserted below the body 4 of the valve.

Such a magnet exerts a permanent force of attraction relative to wall 10 attracting the latter to the closing position, it dampens the vibrations and it enhances the comeback of the wall after the stroke against the bumper.

Moreover, the potential of the applied magnetic field, beside a mechanical operation on the wall, acts also electrostatically on the chemical and physical structure of the fuel mixture flow, since a strong electrostatic field is induced on the edge of the wall which is vibrating in the magnetic field.

Such a field causes an acceleration effect on the electrons which, while striking air particles of the fuel mixture, liberate more loaded particles; then, the main charge on the edge of the wall attracts a part of such particles that, being of an opposite sign, neutralise the charge at the edge of the wall.

Conversely, particles of the same sign as these of the charge at the edge of the wall are rejected and carry with them a part of the mixture, thereby forming an electrical wind.

At the same time, the electrostatic field induced at the edge of the wall has an opposite sign in respect of the field induced between the electrodes of the plug that forms a spark in the particles ionised by the gas.

The opposed charges of the fields cause then electrostatic attraction and maximal condensation of loaded particles of fuel around the electrodes of the plug either before the spark forms or during the period of spark ignition, which affects economical consumption of fuel and the increase of engine power.

In the meantime, a particular inertia of particles of fuel in relation to electrostatic forces causes the elimination of the part of electrical charges, which reduces their superficial strength and increases the diffusion coefficient; thereby, the combustion time is reduced and the intensity of the combustion increased.

I claim:

1. Aspirating thermodynamic valve capable of controlling the flow of fuel mixture and air from the carburettor to the crankcase of a two-stroke engine, comprising a hollow body to be placed between the joint of the crankcase and the joint of the carburettor, along with suitably interpositioned seals, a bush, the extremity of which is placed inside of said body and cut out according to a predetermined inclination, and a wall which is hinged by one end and is capable of closing said extremity, wherein said wall is made of ferromagnetic material and in that a permanent magnet is mounted on the body of the valve in correspondence of wall in order to carry out on said wall a force of attraction which holds the wall in the position of the closure of the mentioned bush.

2. A valve as claimed in the claim 1, wherein said wall carries a weight in correspondence of its extremity placed away of the hinge.

3. A valve as claimed in claim 1, wherein the valve comprises means capable of limiting the movement of aperture of the wall.

4. A valve as claimed in claim 3 wherein said means comprise a telescoping bumper element, on the extremity of which there are resilient means advantageously consisting of springs, capable of dampening the stroke carried out by the wall during the run of its opening movement.

5. A valve as claimed in claim 2, wherein the valve comprises means capable of limiting the movement of aperture of the wall.

6. A valve as claimed in claim 5 wherein said means comprise a telescoping bumper element, on the extremity of which there are resilient means advantageously consisting of springs, capable of dampening the stroke carried out by the wall during the run of its opening movement.

* * * * *